Figure 1:
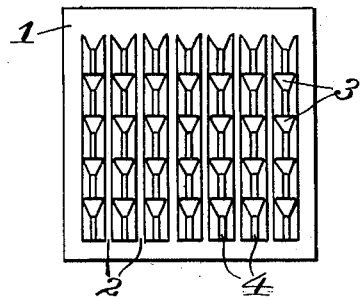

Feb. 24, 1925.

N. J. OLSSON

METHOD OF MANUFACTURING SPUR WHEELS 1,527,697

Filed Aug. 18, 1921   2 Sheets-Sheet 1

INVENTOR
N. J. Olsson
BY
Rogen, Kennedy & Campbell
ATTYS

Feb. 24, 1925.  1,527,697
N. J. OLSSON
METHOD OF MANUFACTURING SPUR WHEELS
Filed Aug. 18, 1921    2 Sheets-Sheet 2
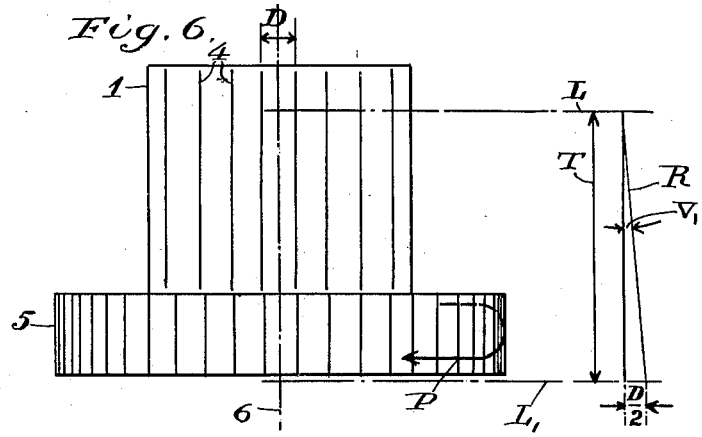
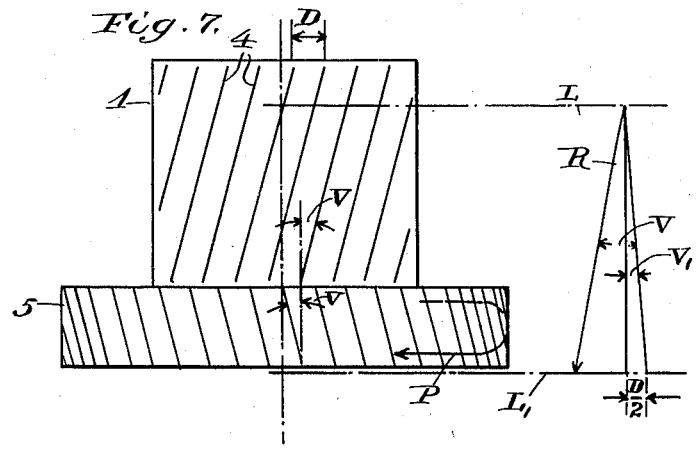
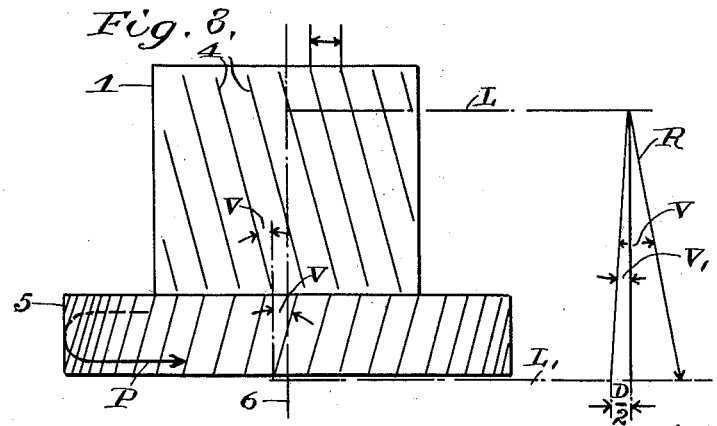
INVENTOR
N. J. Olsson
BY
Rogers, Kennedy & Campbell
ATTYS.

Patented Feb. 24, 1925.

1,527,697

UNITED STATES PATENT OFFICE.

NILS JOSEF OLSSON, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF MANUFACTURING SPUR WHEELS.

Application filed August 18, 1921. Serial No. 493,251.

*To all whom it may concern:*

Be it known that I, NILS JOSEF OLSSON, a subject of the King of Sweden, residing at Gottenborg, in the Kingdom of Sweden, have invented new and useful Methods of Manufacturing Spur Wheels, of which the following is a specification, reference being had to the drawing accompanying and forming a part thereof.

The present invention relates to a method of manufacturing spur wheels, having straight or skew teeth, by cutting according to the rolling or generating principle.

The present invention has for its object to remove the drawbacks heretofore experienced, and consists, essentially, in the generation being performed by the aid of a cutting tool having a plurality of teeth across and a plurality of teeth in longitudinal direction, said tool being caused to reciprocate in a direction forming an angle with the axis of rotation of the wheel blank, while the latter is caused to continuously rotate about its axis.

Figure 2:
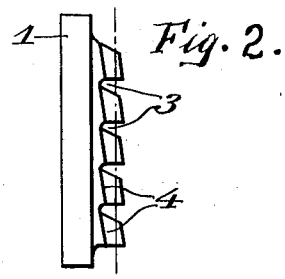
Figure 3:
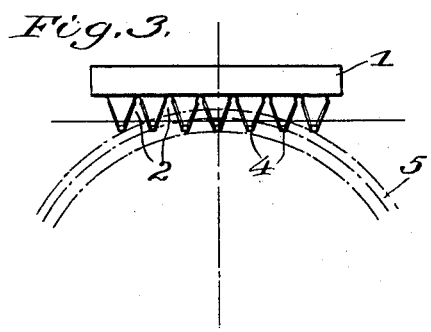
Figure 4:
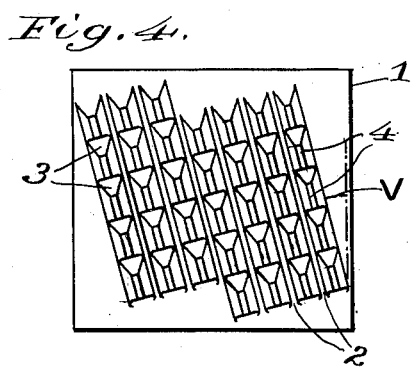
Figure 5:
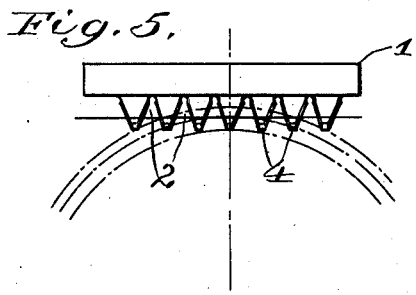

The invention is illustrated in the annexed drawings. Fig. 1 is a front view of a cutting tool for gear wheels having straight teeth. Fig. 2 is a side view and Fig. 3 is a top view thereof. Fig. 4 is a front view of a cutting tool for gear wheels having skew teeth. Fig. 5 is a top view thereof. Fig. 6 illustrates schematically how to produce a spur wheel having straight teeth. Fig. 7 shows in what manner a left-cut spur wheel is produced. Fig. 8 shows in what manner a right-cut spur wheel is produced. For the sake of simplicity, cutting teeth and gear teeth are marked, in Figs. 6, 7, and 8, by straight lines.

The cutting tool shown in Figs. 1 to 3 consists of a plate 1 having longitudinal grooves 2 cut into it, said grooves corresponding to the gaps of a given generating rack. Cut into the plate 1 are, further, transverse grooves 3 so that the tool looks like a series of racks lying one after the other, each tooth of said racks forming a cutting tooth 4, to which end it is formed with the usual clearance at the side and top surfaces. A sufficient number of cutting teeth 4 should be provided across to take up at least the distance between the points of intersection of the outer circle of the wheel blank 5 (Fig. 3) with the top line of the tool. In the form of embodiment of the tool shown in Figs. 1 to 3, the number of teeth across is seven. The number of teeth longitudinally depends, as mentioned, on the accuracy with which it is desired to generate the tooth profile. In the form of embodiment shown there are five.

The cutting tool for gear wheels having skew teeth shown in Figs. 4 and 5 differs from that according to Figs. 1 to 3 only in the cutting teeth 4 being arranged obliquely on plate 1, the angle of obliquity V corresponding to the angle of skew of the gear wheels to be produced by the tool in question.

It is common to the two tools above described, that the anterior surfaces, with regard to the direction of cutting, of the cutting teeth of each transverse row lie in the same plane which facilitates the manufacturing of the tool proper and the necessary regrinding of it. In Figs. 6 to 8 the cutter moves downward (towards the foot of the sheet) during the cutting stroke, the positions in the views representing the relative position of cutter and blank at the commencement of the cutting stroke. The cutter operates behind the blank with relation to the observer's eye. The trend of R is to be viewed as downward.

In the method illustrated in Fig. 6, 1 designates the cutting tool, 4 designates its cutting teeth, and 5 designates the wheel blank. The distance between the cutting teeth 4, counted in the transverse direction of the tool, is designated D and represents the pitch. The stroke or vertical feed of the tool is represented by the perpendicular distance T between the lines L and $L_1$. The wheel blank 5 is considered to revolve about its axis 6, in the direction of the arrow P, with an angular speed corresponding to the pitch D, at each reciprocating movement of the tool 1 for a distance T. This rotation of the wheel blank 5 is, hereby, assumed to be divided in such manner that one half takes place during the working stroke of the tool and one half during its idle stroke, which involves that the cutting movement of the tool, including also the lateral movement of the tool required for the theoretically true generation, must take place in a direction R forming with the axis 6 of the wheel blank an angle $V_1$ the size of which is fully determined by the ratio between half the pitch (½ D) and the vertical feed T. The tool 1, which is here considered to be fed, from the beginning, to full cutting depth into the wheel blank, shall in this case have the same speed in the working stroke as in the idle stroke. When the tool has carried out one stroke, the wheel blank has thus turned through an angle corresponding to half the pitch D, and the tooth profiles in question have hereby been generated half-way. During the idle stroke of the tool, during which it is to be brought, as usual, out of engagement with the wheel blank, the latter has turned through half a pitch so that, in the next working stroke, the tool will generate adjacent gaps half-way. While the tool performs its up and downward movement and the wheel blank turns with constant speed about its axis 6, all gaps will thus be generated half-way, when the wheel blank has turned through one revolution. By then turning the wheel blank through half a pitch, and at the same time correspondingly adjusting the tool sideways, all the gaps will be entirely generated by repeating the cutting process described while the wheel blank turns through a revolution. The relative adjustment of the tool and the wheel blank hereinbefore set forth can also be performed by so readjusting the tool, besides adjusting it laterally, that the working stroke will take the place of the idle stroke, as regards the time, and vice versa. Hereby, the adjustment of the wheel blank is done away with. The lastmentioned readjustment of the tool can, e. g., be effected by the latter (the tool slide) obtaining its movement from a rotary cam disk, eccentric, or the like, adapted to be secured in position after having been turned through 180° relatively to the shaft by which it is driven.

The method illustrated in Fig. 7 differs from that according to Fig. 6 only as regards the angle between the direction of movement R of the tool 1 and the axis of rotation 6 of the wheel blank 5. The case is that this angle is also dependent, as indicated, on the angle of obliquity V and will in this instance be equal to the difference between this angle V and the angle $V_1$, the latter being dependent solely, as in the method according to Fig. 6, on the length of stroke and the pitch.

In the method of cutting spur wheels having dextral teeth shown in Fig. 8, the direction of rotation P of the wheel blank 5 is opposite to that shown in Fig. 7, and the cutting teeth of the tool 1 are also directed differently, corresponding to the oblique position of the teeth of the gear wheel to be produced. Otherwise the generating is performed in the same manner as in the methods according to Figs. 6 and 7.

In the methods illustrated in Figs. 6 to 8, the axis of the wheel blank has been assumed to be vertical and, as a consequence, the movement of the tool to take place in an inclined direction. It is, however, obvious that these directions may be chosen at will, e. g., so that the direction of movement of the tool be vertical and, thus, the direction of the axis of the wheel blank be inclined.

I claim:

1. The method of generating spur wheels which consists in continuously rotating the wheel blank about its axis, and reciprocating across the blank, in a direction forming an angle with the axis of its rotation, a non-rotary cutting tool having a plurality of teeth across and a plurality of teeth in longitudinal direction.

2. The method according to claim 1, characterized by the wheel blank being caused to turn, during each reciprocation of the tool, through an angle corresponding to the pitch, or a multiple thereof.

3. The method according to claim 1, characterized by the wheel blank being caused to turn through an angle corresponding to half the pitch, or a multiple thereof, for each working stroke of the tool and through an equal angle for each idle stroke of the tool, the latter being caused to move with the same speed during the working stroke as during the idle stroke.

In testimony whereof I have signed my name.

NILS JOSEF OLSSON.